US005167875A

United States Patent [19]

De Rycke et al.

[11] Patent Number: 5,167,875

[45] Date of Patent: Dec. 1, 1992

[54] SILVER SULPHIDE SOL WITH ULTRAFINE PARTICLE SIZE

[75] Inventors: Gino L. De Rycke, Mortsel; Freddy Henderickx, Olen, both of Belgium

[73] Assignee: Agea-Gevaert N. V., Mortsel, Belgium

[21] Appl. No.: 425,020

[22] Filed: Oct. 23, 1989

[30] Foreign Application Priority Data

Oct. 26, 1988 [EP] European Pat. Off. ........ 88202377.3

[51] Int. Cl.[5] .......................... G02B 5/20; G02B 5/22; F21V 9/04; G03C 1/06

[52] U.S. Cl. .................................... 252/584; 252/588; 252/313.1; 430/603; 430/617; 430/921; 359/361

[58] Field of Search ...................... 423/561.1; 430/603, 430/617, 921; 252/582, 584, 587, 588, 315.01, 313.1; 359/350, 361

[56] References Cited

U.S. PATENT DOCUMENTS 3,655,412 4/1972 Kumai et al. ........................ 252/582
3,674,703 7/1972 Moll et al. ........................... 252/582
4,897,343 1/1990 Ikeda et al. ......................... 430/603
4,942,119 7/1990 Ozin et al. ........................... 430/617
5,024,923 6/1991 Suzuki et al. ........................ 252/587

FOREIGN PATENT DOCUMENTS 366181 5/1990 European Pat. Off. .

OTHER PUBLICATIONS

Mumaw, Photographic Science and Engineering, vol. 24, No. 2, pp. 77-83 (1980).

*Primary Examiner*—Robert L. Stoll
*Assistant Examiner*—Philip Tucker
*Attorney, Agent, or Firm*—William J. Daniel

[57] ABSTRACT

An aqueous silver sulfide sol is prepared which has an absorption spectrum such that its optical density at 360 nm is at least 100 times its optical density at 700 nm. The sol is ultrafine in particle size and is useful for the chemical sensitization of silver halide emulsions and for the preparation of development layers for the silver complex diffusion transfer copying process or the production of optical filters.

20 Claims, 4 Drawing Sheets

SILVER SULPHIDE SOL WITH ULTRAFINE PARTICLE SIZE

FIELD OF THE INVENTION

The present invention relates to stabilized silver sulphide sols of ultrafine colloidal particle size and their production and applications.

BACKGROUND OF THE INVENTION

Sulphur sensitization by means of labile sulphur compounds is a widely-used method for conferring speed and contrast to a silver halide emulsion. It is normal practice today to start with inert gelatin which is substantially free from labile sulphur compounds and to introduce them, e.g. thiosulphate, in desired quantity during chemical sensitization. After addition to the silver halide emulsion, the sulphur sensitizer is rapidly adsorbed to the crystal surface. Its adsorption may occur either by the reaction of silver ions present on the crystal surface with sensitizer, e.g. thiosulphate, to form the complex ion in adsorbed state or by the formation of the complex ion from the very low concentration of silver ions existing in solution in the emulsion, followed by adsorption to the crystal surface. The adsorbed complex is then decomposed into $Ag_2S$.

The silver sulphide forming part of the crystal surface by displacement of bromide ions and the replacement of each pair of such ions by one doubly-charged sulphide ion must not be confused with the massive quantities of silver sulphide formed in a simple chemical reaction wherein silver sulphide is produced as a brown precipitate.

SUMMARY OF THE INVENTION

It is an object of the present invention to provide novel silver sulphide sols wherein the colloidal silver sulphide particles have a specific luminescence spectrum.

It is a further object of the present invention to provide a process for the production of such sols.

Still further objects are the use of said sols in the preparation of silver halide photographic materials, diffusion transfer reversal materials and optical filters.

Other objects and advantages of the present invention will appear from the further description.

According to the present invention an aqueous silver sulphide sol is provided which has such absorption spectrum that in the curve "optical density versus wavelength in nm" the ratio of optical density at 350 nm to optical density at 700 nm is at least 100:1. Preferably said sol is characterized in solidified state at 77° K. by such luminescence spectrum that more than 80% of the area circumscribed by the curve representing the relationship of relative luminescence intensity versus wavelength in nm is in the wavelength range of 520 to 920 nm, preferably in the wavelength range of 520 to 850 nm, and that the said curve has a maximum situated between 550 and 850 nm, preferably situated between 550 and 750 nm, the measurement of the luminescence spectrum being effected with stimulating light of 365 nm.

In a practical embodiment the measurement of the luminescence spectrum is carried out with a PERKIN ELMER (trade name) model 2000 fluorescence spectrophotometer keeping the sample at 77° K. with liquid nitrogen.

In particularly stable silver sulphide sols according to the present invention a non-proteinaceous grain growth restrainer is present.

According to the present invention a process is provided for the production of an aqueous silver sulphide sol that is characterized by such absorption spectrum that in the curve "optical density versus wavelength in nm" the ratio of optical density at 350 nm to optical density at 700 nm is at least 100:1 and such luminescence spectrum that more than 80% of the area circumscribed by the curve "relative luminescence intensity versus wavelength in nm" is in the wavelength range of 520 to 920 nm and that the said curve has a maximum situated between 550 and 850 nm, the measurement of the luminescence spectrum being effected at 77° K. with stimulating light of 365 nm, said process comprising the steps of:

(1) mixing at a temperature below 10° C. an aqueous solution containing a dissolved silver compound providing silver ions with an aqueous solution containing a dissolved sulphur compound providing sulphide ions and/or a dissolved sulphur compound forming silver sulphide with silver ions by decomposition, and (2) adding to the mixture a non-proteinaceous grain growth restrainer, e.g. a grain growth restrainer selected from the group consisting of an azaindene compound and an organic mercapto compound, while maintaining the temperature of said mixture below 10° C.

BRIEF DESCRIPTION OF THE DRAWINGS

In the FIGS. 1 and 3 luminescence spectra are given of silver sulphide sols prepared according to the present invention. Curve 4 in FIG. 1 represents a luminescence spectrum of a silver sulphide sol prepared without grain growth restrainer.

DETAILED DESCRIPTION OF THE INVENTION

Figure 1:
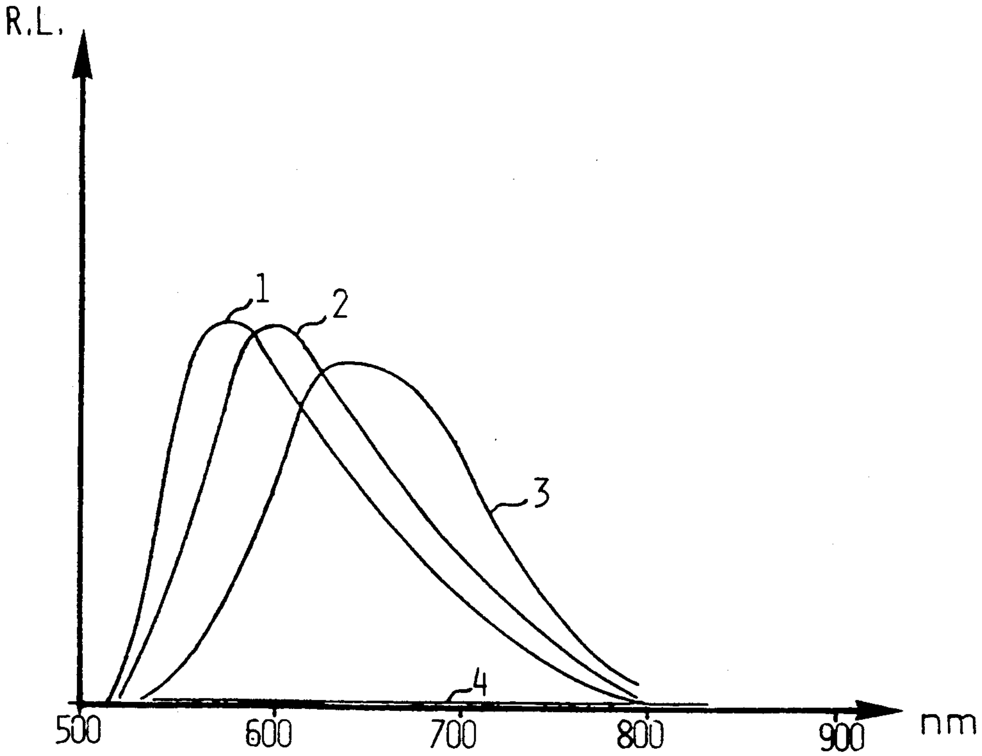

A preferred grain growth restrainer is capable of refraining the silver sulphide particles in the sol as defined above from growing to such a degree that after keeping the sol for 8 h at 10° C. starting from the termination of the addition of the grain growth restrainer there still exists the requisite ratio of densities measured at 350 and 700 nm.

Preferably grain growth restrainer is added to the sol in a molar amount of at least $10^{-5}$ with respect to the total silver content.

Preferred grain growth restrainers are selected from the group consisting of an azaindene compound and an organic mercapto compound including its tautomeric thione structure.

Optionally the production of the silver sulphide sol proceeds in the presence of a minor amount (less than 5% by weight with respect to the total silver content) of a protective hydrophilic colloid such as gelatin.

Examples of watersoluble sulphur compounds forming silver sulphide on decomposition in the presence of silver ions are alkali metal and ammonium thiosulphates and tetrathionates. Other sulphur compounds suited for forming silver sulphide are labile sulphur compounds examples of which are thiourea and derivatives thereof such as diacetyl-thiourea and a N-acyl-N'-allylthiourea.

Thiourea forms silver sulphide very slowly in the acid pH range, whereas at pH 8 it reacts very rapidly. So, the pH can be used to control the speed of silver sulphide formation and to make the point of time of the addition of the grain growth restrainer less critical.

Particularly useful results in the production of silver sulphide sols according to the present invention are obtained by preparing in step (1) a mixture of an aqueous solution of silver nitrate and an aqueous solution of sodium thiosulphate, wherein the molar ratio of silver nitrate to sodium thiosulphate applied in the preparation is in the range from 1:10 to 10:1.

Suitable restrainers for grain growth of silver sulphide can be found in the class of organic stabilizers or antifoggants of photographic silver halide emulsions. A survey of such compounds is given e.g. by Pièrre Glafkidès in Photographic Chemistry, vol. 1, (1958) - Fountain Press - London, p. 374–379.

Examples of particularly useful restrainers for the grain growth of silver sulphide in the process according to the present invention are tetrazaindene and pentazaindene compounds, especially those substituted with hydroxy or amino groups. Such compounds are described by Birr, Z. Wiss. Phot. 47, (1952), p. 2–58.

4-Hydroxy-6-methyl-1,3,3a,7-tetrazaindene is a preferred compound for use according to the present invention.

Other particularly useful restrainers for the grain growth of silver sulphide are aliphatic and heterocyclic mercapto compounds, the watersolubility of which is improved by a hydroxy or a carboxy substituent. An example of a useful aliphatic mercapto compound is cysteine.

Examples of particularly useful heterocyclic mercapto compounds are: mercapto-pyrimidines, e.g. 2-mercapto-4-hydroxypyrimidine, 2-mercapto-benzthiazoles, 2-mercaptobenzimidazoles, 2-mercaptothiazoles, 2-mercapto-benzoxazoles, 2-mercapto-1,2,4-triazoles and 1-phenyl-5-mercapto-tetrazole compounds containing on the phenyl nucleus a substituent including a carboxy group to improve their watersolubility.

The mixing in steps (1) and (2) is preferably effected with a high speed mechanical stirrer but any other mixing means such as an ultra-sound mixing device providing rapid and effective mixing may be used.

The temperature at which the mixing takes place is preferably below 5° C. According to a practical embodiment for that purpose the mixing vessel is mounted in an ice-water mixture already in advance of the mixing and during the mixing. The temperature of the mixing may be higher than 5° C. when the formation speed of the silver sulphide can be slowed down, e.g. for a reaction between silver nitrate and thiourea at a pH in the acidic range and when the grain growth restrainer in the silver sol formation is used in the starting solution containing a sulphide ion generating compound, i.e. labile sulphur compound.

In a preferred embodiment of the process according to the present invention in step (1) an aqueous silver nitrate solution containing no gelatin or only a minor amount of gelatin (less than 1% by weight with respect to the silver nitrate) is cooled down below 5° C. and thereto a pre-cooled aqueous solution of sodium thiosulphate having a temperature not higher than 5° C. is added at once, whereupon in step (2) a pre-cooled (5° C.) aqueous solution of grain growth restrainer is added.

During the mixing of the solution providing sulphide ions with the solution containing silver ions the colour changes gradually from yellow over orange to red indicating grain growth. At the desired stage of grain size the aqueous solution of grain growth restrainer is added. In any event grain growth restrainer is added before the sol turns brown giving the sol an optical density larger than zero at 700 nm.

The silver sulphide sols prepared according to the present invention have interesting utility in silver halide photography.

According to a particularly interesting application a silver sulphide sol prepared according to the present invention is added to and mixed with photosensitive silver halide at any stage of the latter's preparation resulting e.g. in chemical sensitization. By addition to a silver halide emulsion a rapid and easily reproducible sulphur sensitization is obtained which we may assume is due to the adsorption of the very small silver sulphide particles on the much larger silver halide grains having normally a grain size larger than 100 nm. If the colloidal silver sulphide particles would not firmly be adhered to the silver halide lattice then they would be inactive and not form a sensitivity speck. The increase of photosensitivity by silver sulphide in layer form, e.g. as islands on the silver halide grain surface, is based on a theory of James and Vanselow [ref. J. Phys. Chem., 57, 725 (1953)].

The chemical sulphur sensitization of photosensitive silver halide grains by a silver sulphide sol prepared according to the present invention is illustrated in Example 3 given furtheron.

According to a particular embodiment said sulphur sensitization with the present sol is carried out in combination with thiocyanate ions.

According to another embodiment the sulphur sensitization of a photosensitive silver halide emulsion proceeds in combination with a gold sensitizer for the photosensitive silver halide of said emulsion, said gold sensitizer being added to the silver halide emulsion together with and/or after the addition of said sol. The gold sensitization proceeds e.g. with $Au^{3+}$ ions stemming e.g. from a dithiocyanatoaurate(I).

The halide composition of the silver halide emulsions to be mixed with a silver sulphide sol according to the present invention is not specifically limited and may be any composition selected from i.a. silver chloride, silver bromide, silver iodide, silver chlorobromide, silver bromoiodide, and silver chlorobromoiodide. The content of silver iodide may be equal to or less than 20 mol %, preferably equal to or less than 5 mol %, even more preferably equal to or less than 3 mol %.

The photographic silver halide emulsions used according to the present invention can be prepared by mixing the halide and silver solutions in partially or fully controlled conditions of temperature, concentrations, sequence of addition, and rates of addition. The silver halide can be precipitated according to the single-jet method, the double-jet method, or the conversion method.

The silver halide particles of the photographic emulsions may have a regular crystalline form such as a cubic or octahedral form or they may have a transition form. They may also have an irregular crystalline form such as a spherical form or a tabular form, or may otherwise have a composite crystal form comprising a mixture of said regular and irregular crystalline forms. For detailed information about silver halide emulsion preparation and types reference is made e.g. to Research Disclosure December 1978, item 17643 and January 1983, item 22534.

The silver halide grains may have a multilayered grain structure. According to a simple embodiment the grains may comprise a core and a shell, which may have different halide compositions and/or may have undergone different modifications such as the addition of dopes. Besides having a differently composed core and shell the silver halide grains may also comprise different phases inbetween.

Two or more types of silver halide emulsions that have been prepared differently can be mixed for forming a photographic emulsion.

The size distribution of the silver halide particles of the photographic emulsions to be used according to the present invention can be homodisperse or heterodisperse. A homodisperse size distribution is obtained when 95% of the grains have a size that does not deviate more than 30% from the average grain size which is e.g. from 0.1 to 1 μm.

In a particular embodiment the silver sulphide sol according to the present invention is used for forming silver halide emulsions containing silver halide grains with internal electron or hole traps.

According to an embodiment the sulphur sensitization of a photosensitive silver halide emulsion proceeds in combination with a spectral sensitizer for the photosensitive silver halide of said emulsion, said spectral sensitizer being added to the silver halide emulsion together with and/or after the addition of said sol.

According to another use in the field of silver halide photography the prepared silver sulphide sol is applied on a support to form a development nuclei layer for use in diffusion transfer reversal (DTR-) photography. The principles and details of DTR-photography are described e.g. by André Rott and Edith Weyde in Photographic Silver Halide Diffusion Transfer Processes - The Focal Press, London and New York (1972). Because the silver sulphide grains prepared according to the present invention are ultrafine a very large amount of development centres can be obtained with only a very small mass of silver sulphide that gives practically no image background density. Moreover, a good control of size and number of image deposite sites is in favour of image quality.

According to a further application the silver sulphide prepared according to the present invention is used for the production of an optical filter. A supported or self-supporting gelatin binder layer containing the silver sulphide prepared according to the present invention constitutes an optical filter element strongly absorbing in the ultra-violet range and may serve as cut-off filter as can be derived from the absorption spectra represented in the accompanying FIG. 2.

The invention is illustrated by the following examples without limiting its scope. All ratios and percentages are by weight unless otherwise indicated.

EXAMPLE 1

COMPARATIVE EXAMPLE

Preparation of composition A

While stirring 2.5 g of gelatin were dissolved at 40° C. in 530 ml of distilled water whereupon 0.075 mole of silver nitrate in 25.5 ml of distilled water were added to form a solution.

Preparation of composition B

While stirring 9.5 g (0.038 mole) of $Na_2S_2O_3.5\ H_2O$ were dissolved at 20° C. in 270 ml of distilled water.

Preparation of composition C

While stirring 15.26 g (0.1017 mole) of 4-hydroxy-6-methyl-1,3,3a,7-tetrazidene having structural formula no. 1 in Table 1 hereinafter were dissolved at 20° C. in 350 ml of distilled water.

The compositions A, B and C were cooled down in ice-water to 4° C.

Preparation of sample 1

Under vigorous stirring with high speed mixer composition B was added quickly to composition A while keeping the temperature at 4° C. After 3 seconds to the obtained pale yellow sol composition C was added while maintaining the temperature at 4° C. and continuing stirring.

After 3 minutes at 4° C. a sample of the obtained sol was put in a PERKIN ELMER (trade name) model 2000 fluoresence spectrophotometer and the luminescence spectrum of the sample was measured at 77° K. using excitation light of 365 nm.

In the accompanying FIG. 1 curve 1 represents the obtained luminescence spectrum having in the ordinate of the diagram relative luminescence intensity (R. L.) and in the abscis the emission wavelength in nm.

Preparation of sample 2

The preparation of sample 1 was repeated with the difference that the addition of composition C to the mixture of compositions A and B proceeded 9 seconds after termination of the addition of composition B to composition A.

In the accompanying FIG. 1 curve 2 represents the obtained luminescence spectrum of sample 2.

Preparation of sample 3

The preparation of sample 1 was repeated with the difference that the addition of composition C to the mixture of compositions A and B proceeded 20 seconds after termination of the addition of composition B to composition A.

In the accompanying FIG. 1 curve 3 represents the obtained luminescence spectrum of sample 3.

Preparation of sample 4

The preparation of sample 1 was repeated with the difference that no addition of composition C took place, so the silver sulphide sol was prepared in the absence of a grain growth restrainer.

In the accompanying FIG. 1 curve 4 represents the luminescence spectrum of sample 4 obtained 3 minutes after its preparation.

Figure 2:
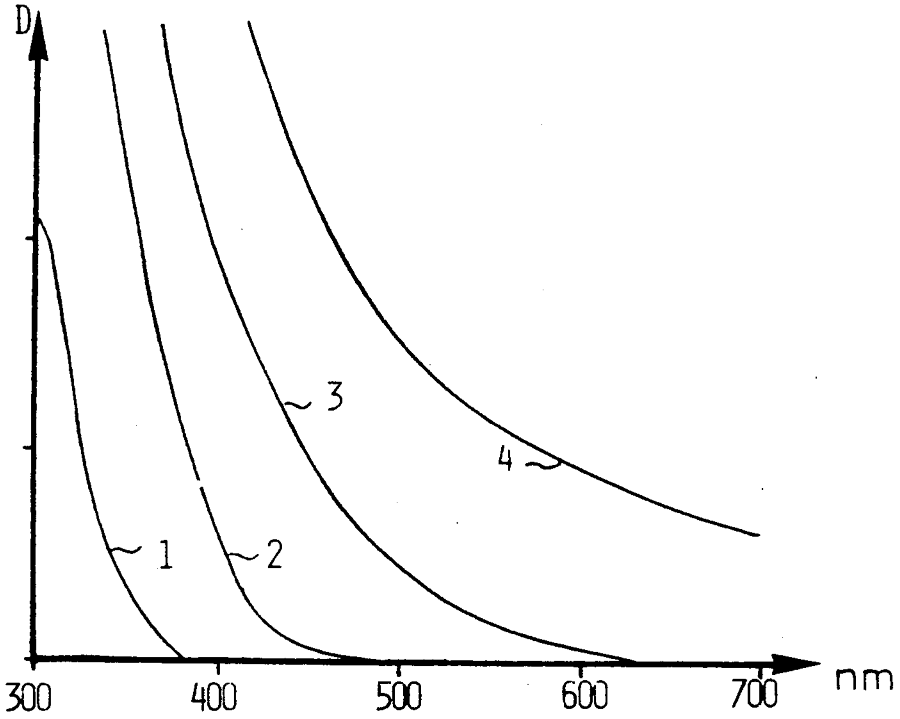
In FIG. 2 absorption spectra of said silver sulphide sols prepared according to the present invention and of a sol free from grain growth restrainer are given.

The optical density (D) versus wavelength (nm) of the above samples 1 to 4 was measured in transmission using a liquid section of 0.5 cm at a silver concentration of 0.013 atom gram per liter obtained by dilution. The obtained curves 1, 2, 3 and 4 corresponding respectively with the samples 1, 2, 3 and 4 are represented in FIG. 2.

EXAMPLE 2

Preparation of composition A

While stirring 0.17 g of $AgNO_3$ were dissolved at 20° C. in 100 ml of distilled water resulting in a $10^{-2}$ molar solution.

Preparation of composition B

While stirring 0.124 g of $Na_2S_2O_3.5\ H_2O$ were dissolved at 20° C. in 50 ml of distilled water resulting in a $10^{-2}$ molar solution.

Preparation of composition C

While stirring 0.11 g of 4-hydroxy-6-methyl-1,3,3a,7-tetrazaindene having structural formula no. 1 in the Table 1 hereinafter were dissolved at 20° C. in 10 ml of distilled water resulting in a $7.3\times10^{-2}$ molar solution.

Preparation 1

The compositions A, B and C were cooled down in ice-water to 4° C.

Under vigorous stirring with high speed mixer composition A was added quickly to composition B while keeping the temperature at 4° C. To the obtained pale yellow sol composition C was added while maintaining the temperature at 4° C. and continuing stirring.

After 1 minute stirring and keeping the temperature at 4° C. a sample of the obtained sol was put in a PERKIN ELMER (trade name) model 2000 fluoresence spectrophotometer and the luminescence spectrum of the sample was measured at 77° K. using excitation light of 365 nm.

Figure 3:
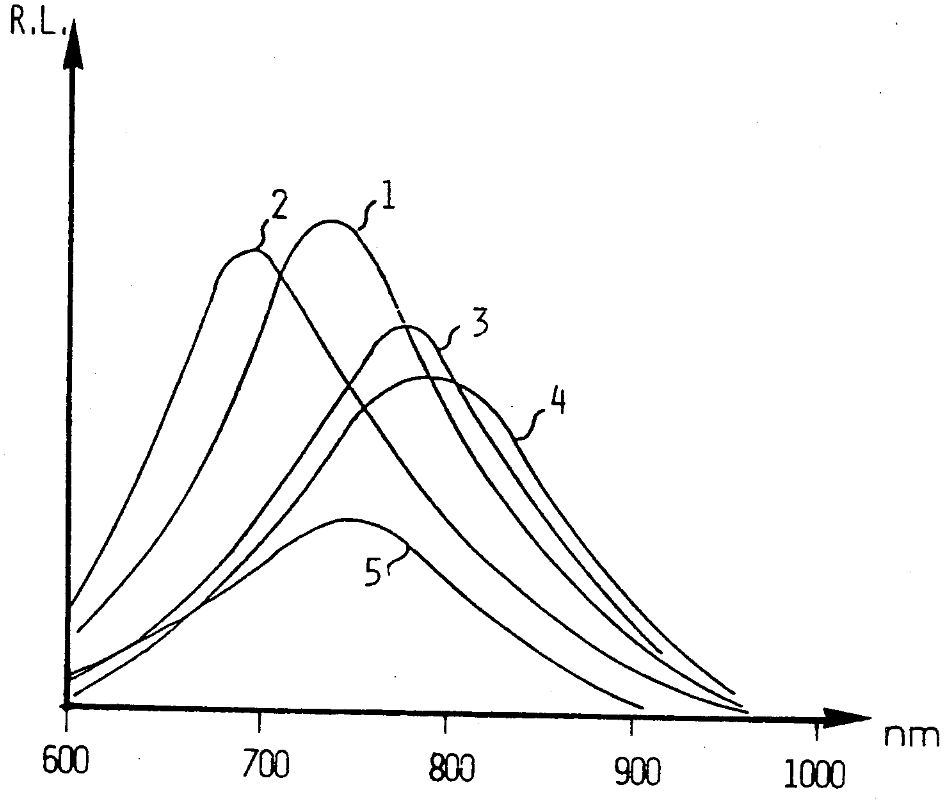

In the accompanying FIG. 3 curve 1 represents the obtained luminescence spectrum having in the ordinate of the diagram relative luminescence intensity (R. L.) and in the abscis the emission wavelength in nm.

Preparations 2 to 5

The above preparation 1 of a grain growth restrained silver sulphide sol was repeated with the difference that in preparations 2 to 5 grain growth restrainers having the structural formulae nos. 2 to 5 of Table 1 were used.

The compounds 2 to 5 as well as compound 1 are known as stabilizers for silver halide emulsions.

The measured luminescence of the sols obtained by the preparations 2 to 5 is represented in FIG. 3 by the curves 2 to 5.

Figure 4:
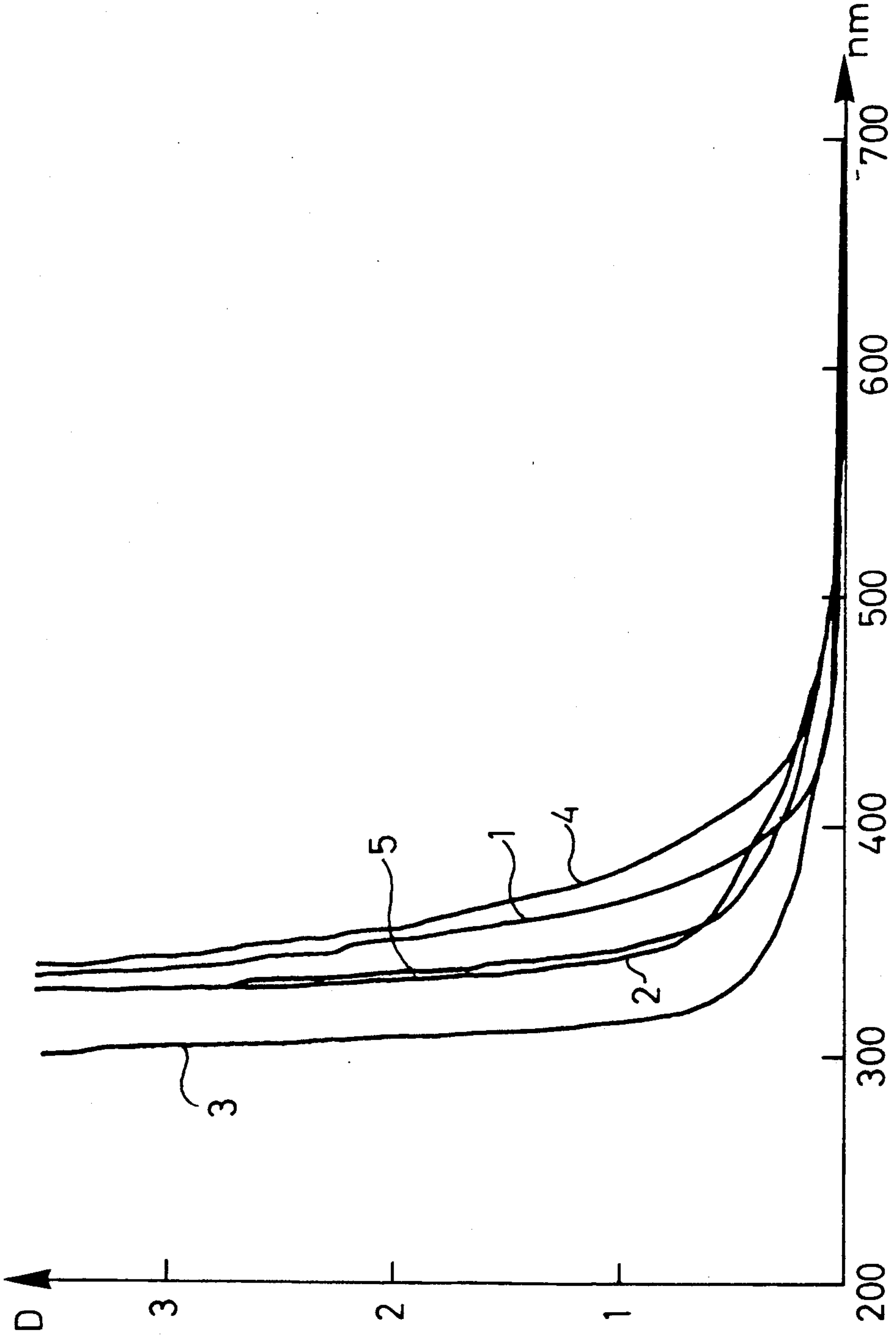
In FIG. 4 absorption spectra of the silver sulphide sols prepared according to Example 2 are given.

In FIG. 4 the absorption spectra of the silver sulphide sols obtained by preparations 1 to 5 are given.

TABLE 1

| No. | Structural formula |
|---|---|
| 1. | 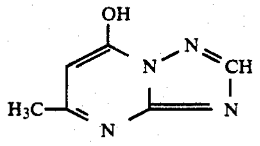 |
| 2. | 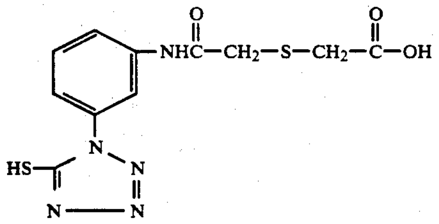 |
| 3. | 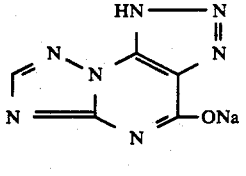 |
| 4. | 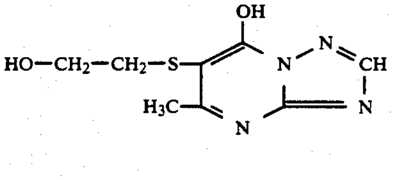 |

TABLE 1-continued

| No. | Structural formula |
|---|---|
| 5. | 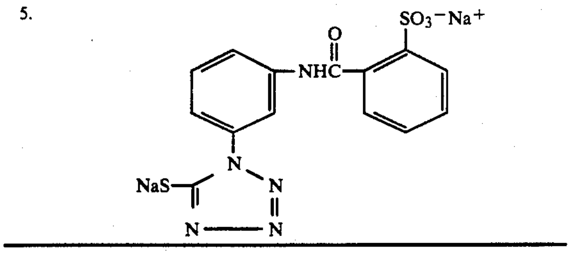 |

EXAMPLE 3

A silver halide emulsion was prepared by double jet technique pouring while stirring an aqueous silver nitrate solution and an aqueous solution of a mixture of potassium bromide and potassium iodide into an aqueous gelatin solution of potassium iodide (the molar ratio of bromide to iodide being 9).

To 1 liter of the thus obtained silver halide emulsion having silver bromo-iodide grains with an average grain size of 0.9 micrometer and a silver halide content of 0.94 mole per liter, different amounts (see Table 2) of the sol prepared according to preparation 1 of Example 1 were added and chemical ripening was carried out therewith by keeping the silver halide emulsion for 15 min at 40° C.

After adding the usual coating ingredients the chemically ripened silver halide emulsions were coated on a subbed polyester film support at a coverage of silver halide corresponding with 10 g of silver nitrate per m2. After drying the silver halide emulsion layers were exposed through a step wedge and developed in a common hydroquinone-p-methylaminophenol sulphate developer.

Photographic speed is expressed as the relative log exposure (Rel. log E) value corresponding with optical density 0.4 above fog of the sensitometric wedge print.

The obtained density (D) at Rel. log E 0.6 was determined and listed in Table 2 hereinafter.

TABLE 2

| Added ml of sol per liter of emulsion | 0 | 0.2 | 2.0 | 20 |
|---|---|---|---|---|
| D | 1.40 | 1.40 | 1.66 | 4 |
| Rel. log E | 3.33 | 3.35 | 2.35 | 1.70 |

The lowest Rel. log E value corresponds with the highest speed and a difference in Rel. log E values of minus 0.30 corresponds with a doubling of the speed.

EXAMPLE 4

COMPARATIVE EXAMPLE

A silver halide emulsion was prepared by double jet technique pouring while stirring an aqueous silver nitrate solution and an aqueous solution of a mixture of potassium bromide and potassium iodide into an aqueous gelatin solution of potassium iodide (99 mol % of bromide to 1 mole % of iodide).

The silver halide emulsion contained silver bromoiodide grains with an average grain size of 0.7 micrometer, tabular form (mean aspect ratio larger than 2/1 for at least 50% of the total projected area of the silver halide grains in the emulsion). In said emulsion the silver halide was present in a content equivalent with 195 g of silver nitrate per liter.

To the thus obtained silver halide emulsion the ingredients mentioned in Table 3 were added. In a first stage the optical sensitizing agent S, having the structural formula mentioned hereinafter, was added to said emulsion at 40° C. and kept at that temperature for 30 minutes. In a second stage a chemical ripening composition (sulphur and gold sensitizers) mentioned likewise in said Table 3 was added at a temperature of 48° C. and ripening was allowed to proceed at that temperature for 90 minutes with a comparison silver halide emulsion that had not been sulphur-sensitized according to the present invention, and for 60 minutes using a same silver halide emulsion but sulphur-sensitized according to the present invention.

The spectrally sensitized and chemically ripened silver halide emulsion was coated on a subbed polyester film support at a coverage of silver halide corresponding with 10 g of silver nitrate per $m^2$.

According to a first exposure technique the dried silver halide emulsion layer was flash-light exposed through a neutral grey filter (optical density: 2.4) and a step wedge.

According to a second exposure technique the obtained silver halide emulsion layer was exposed through a yellow filter (density: 2.5) and step wedge. The thus exposed materials were developed in a common hydroquinone-p-methylaminophenol sulphate developer.

The obtained sensitometric results, i.e. photographic speed expressed as the relative log exposure (Rel. log E) value corresponding with optical density 1.0 above fog of the sensitometric wedge print, the maximum density ($D_{max}$), and maximum gradatient (gamma) are expressed in Table 4 in comparison with a silver halide emulsion that has not been sulphur-sensitized with the silver sulphide sol prepared according to Example 1.

TABLE 3

| Ingredients | Comparison Example ml | Invention Example ml |
|---|---|---|
| Optical Sensitizer S 0.25% solution in water | 110 | 110 |
| Chemical ripening composition | | |
| KSCN 10% solution in water | 0.30 | 0.30 |
| $Na_2S_2O_3$ 0.1% solution in water | 0.57 | — |
| $Ag_2S$-sol prepared according to Example 1 | — | 0.1 |
| $Au^{3+}$ sensitization from potassiumdithiocyanatoaurate | 0.37 | 0.37 |

TABLE 3-continued

| Ingredients | Comparison Example ml | Invention Example ml |
|---|---|---|
| 1.46 mole/liter | | |

TABLE 4

| | Sensitometric results | |
|---|---|---|
| | Comparison Example | Invention Example |
| A. Flashlight exposure | | |
| Speed | 2.55 | 2.58 |
| Dmax | 1.32 | 1.35 |
| Gamma | 2.53 | 3.38 |
| B. Exposure through yellow filter | | |
| Speed | 1.63 | 1.58 |
| Dmax | 1.60 | 1.63 |
| Gamma | 3.20 | 4.00 |

Structural Formula of Optical Sensitizing Agent S:

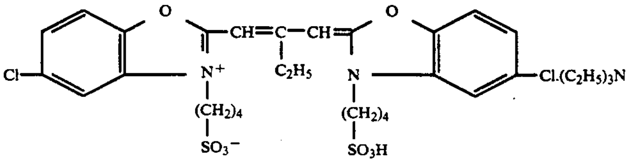

We claim:

1. An aqueous silver sulfide sol having an absorption spectrum such that its optical density at 350 nm is at least 100 times its optical density at 700 nm, said sol being free of silver halide particles.

2. An aqueous silver sulfide sol according to claim 1 having a luminescence spectrum measured in a solid state at 77° with stimulating light of 365 nm such that when the relative luminescence intensity thereof is plotted against wavelength in nm, more than 80% of the area under the resultant plot lies between 520 and 920 and the maximum relative intensity falls between 550 and 850 nm.

3. An aqueous silver sulfide sol according to claim 2 wherein more than 80% of the area under such plot lies between 520 nm and 850 nm and the maximum relative intensity falls between 550 nm and 750 nm.

4. An aqueous silver sulphide sol according to claim 1, wherein said sol contains a non-proteinaceous grain growth restrainer.

5. An aqueous silver sulphide sol according to claim 4, wherein the grain growth restrainer has been added to the sol in a molar amount of at least $10^{-5}$ with respect to the total silver content in the sol.

6. A silver sulphide sol according to claim 4, wherein the grain growth restrainer is selected from the group consisting of an azaindene compound and an organic mercapto compound.

7. A silver sulphide sol according to claim 6, wherein the azaindene compound is 4-hydroxy-6-methyl-1,3,3*a*,7-tetrazaindene.

8. A silver sulphide sol according to claim 4, wherein the grain growth restrainer is a water-soluble aliphatic or heterocyclic mercapto compound, the watersolubility of which is improved by a hydroxy or carboxy substituent.

9. A silver sulphide sol according to claim 4, wherein the grain growth restrainer is an organic mercapto compound selected from the group consisting of a mercapto-pyrimidine, a 2-mercapto-benzthiazole, a 2-mercaptobenzimidazole, a 2-mercapto-thiazole, a 2-mercaptobenzoxazole, a 2-mercapto-1,2,4-triazole and a 1-phenyl-5-mercapto-tetrazole compound containing on the phenyl nucleus a substituent including a carboxy group to improve its watersolubility.

10. A silver sulphide sol according to claim 1, wherein the amount of gelatin in the sol is less than 5% by weigth with respect to the total silver content.

11. A process for the production of an aqueous silver sulphide sol according to claim 1 comprising the steps of:

(1) mixing at a temperature below 10° C. an aqueous solution containing a dissolved silver compound providing silver ions with an aqueous solution containing a dissolved sulphur compound providing sulphide ions and/or a dissolved sulphur compound forming silver sulphide with silver ions by decomposition, and (2) adding to the mixture a non-proteinaceous grain growth restrainer while maintaining the temperature of said mixture below 10° C.

12. A process according to claim 11, wherein the compound forming silver sulphide with silver ions by decomposition is an alkali metal or ammonium thiosulphate or tetrathionate.

13. A process according to claim 11, wherein the compound forming silver sulphide by decomposition with silver ions is a thiourea compound including substituted derivatives thereof.

14. A process according to claim 11, wherein said grain growth restrainer is an azaindene compound or an organic mercapto compound.

15. A process according to claim 14, wherein the azaindene compound is 4-hydroxy-6-methyl-1,3,3*a*, 7-tetrazaindene.

16. A process according to claim 14, wherein the organic mercapto compound is a member selected from the group consisting of a mercapto-pyrimidine, 2-mercapto-benzthiazole, 2-mercaptobenzimidazole, 2-mercapto-thiazole, 2-mercapto-benzoxazole, 2-mercapto-1,2,4-triazole and a 1-phenyl-5-mercapto-tetrazole compound containing on the phenyl nucleus a substituent including a carboxy group to improve its watersolubility.

17. A process according to claim 11, wherein in step (1) an aqueous silver nitrate solution containing gelatin in an amount of less than 1% by weight with respect to the silver nitrate is cooled below 5° C. and then immediately admixed with a pre-cooled aqueous solution of sodium thiosulphate having a temperature not higher than 5° C., while in step (2) an aqueous solution of the grain growth restrainer pre-cooled below 5° C. is added.

18. A process according to claim 11, wherein in step (1) an aqueous solution of silver nitrate and an aqueous solution of sodium thiosulphate are mixed, the molar ratio of silver nitrate to sodium thiosulphate being in the range from 1:10 to 10:1.

19. A process according to claim 11 wherein not more than about 5% by wt of the total silver content of a hydrophilic colloid is present during said mixing step (1).

20. In a process for the production of an optical filter, the improvement wherein said filter is formed from silver sulfide derived from an aqueous silver sulfide sol according to claim 1.

* * * * *